Aug. 12, 1924.

L. F. BURNHAM

TROLLEY BASE

Filed Jan. 20, 1923

1,504,602

INVENTOR
Leland F. Burnham
BY
ATTORNEY

Patented Aug. 12, 1924.

1,504,602

UNITED STATES PATENT OFFICE.

LELAND F. BURNHAM, OF WILKINSBURG, PENNSYLVANIA, ASSIGNOR TO R. D. NUTTALL COMPANY, A CORPORATION OF PENNSYLVANIA.

TROLLEY BASE.

Application filed January 20, 1923. Serial No. 613,799.

*To all whom it may concern:*

Be it known that I, LELAND F. BURNHAM, a citizen of the United States, and a resident of Wilkinsburg, in the county of Allegheny and State of Pennsylvania, have invented a new and useful Improvement in Trolley Bases, of which the following is a specification.

This invention relates to trolleys, particularly to a novel construction of a trolley base especially adapted for mine locomotives.

More specifically, the invention relates to a simplified structure of swivel trolley base which shall allow free rotation thereof in a confined space, such as in mine service.

It is among the objects of this invention to provide such a swivel base which shall be easy to assemble, shall have a low height of swivel and which shall include relatively large anti-friction balls to give great strength and reliability of operation to the trolley base.

It is a further object of this invention to provide a simplified structure of trolley base in which the anti-friction balls shall constitute a locking element for the several parts thereof.

In practicing my invention, I provide a support or base member which may be secured to the locomotive, said support having an annular groove therein constituting an outer ball race. Two interlocking members having grooves on the outer surfaces thereof fit into the support and are held in position by the balls in said grooves and a nut which holds the two members together. This structure consists essentially of three parts, one of which is the outer ball race and base and the other two of which constitute the inner ball race and a support for the trolley pole.

Figure 1:
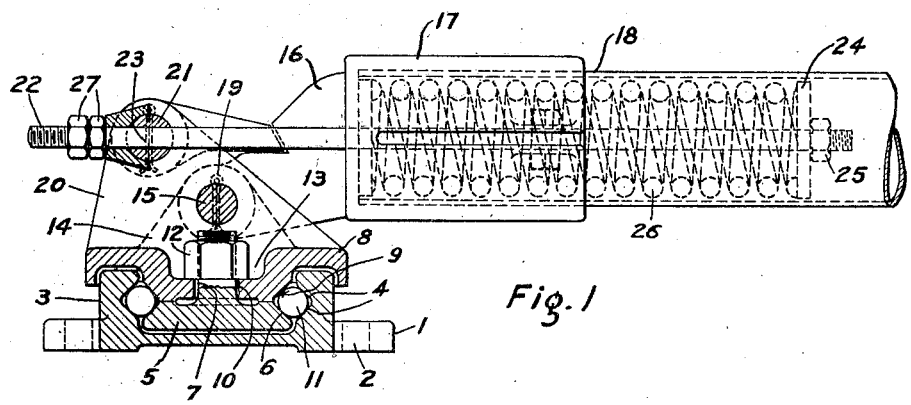
Figure 2:
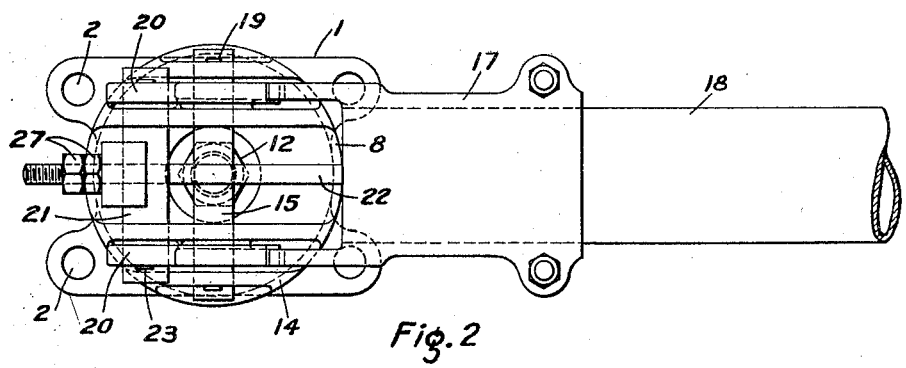

In the accompanying drawing constituting a part hereof and in which like reference characters designate like parts, Fig. 1 is a vertical cross-sectional view of a trolley base structure embodying my invention, some parts being shown in elevation, and Fig. 2 is a plan view thereof.

The base 1 of the support is provided with a suitable number of openings 2 for securing the base to the locomotive and an upwardly extending annular flange 3 having an annular V-shaped groove 4 in the inner surface thereof. Within the flange 3 is a swivel member 5 having a beveled edge 6 in alinement with the lower of the sides of groove 4, and having an upwardly-extending threaded projection 7. A cover member 8, having a beveled lower edge 9, fits into the flanged portion 3 of base 1, allowing projection 7 to extend through a corresponding opening 10 therein. Balls 11 are inserted in the race-way formed by the groove 4 and beveled faces 6 and 9 of members 5 and 8, respectively. A locking nut 12 extending into recess 13 of cover member 8 holds members 5 and 8 in fixed relative positions.

Ears 14, projecting upwardly from cover member 8, have pivoted thereon, by means of shaft 15, a bracket 16 to the outer end of which is secured a split, spring cap 17 into which the inner end 18 of a trolley pole is adapted to extend and to be held therein in any suitable manner. Cotter pins 19 prevent accidental displacement of shaft 15 and associated parts.

A second set of ears 20, also carried by cover member 8, has a shaft 21 pivoted therebetween carrying a rod 22, the ends of which are threaded. Cotter pins 23 hold shaft 21 in proper position. A plate 24 is secured at the outer end of rod 22 by nut 25 and tends to compress spring 26 held between plate 24 and cap 17. Nuts 27 on the inner end of rod 22 allow adjustment of the tension on spring 26.

In order to assemble the trolley base, member 5 is placed within the annular flange 3 of member 1 and a suitable number of balls are distributed in the groove 4. Cover member 8 is placed thereover so that threaded projection 7 extends through opening 10 and nut 12 is threaded into position. The other parts of the trolley structure may be readily assembled on the cover member 8, as will be readily understood.

In my new structure, the anti-friction balls act both as bearing elements and as the elements which lock the rotating swivel consisting of members 5 and 8 and the stationary support together. One of the advantages of the construction is the ease of assembly thereof, it being a simple matter to place the parts in proper relation and then tighten nut 12 to complete the assembly. This structure also results in a low height of swivel and allows the use of relatively large balls to give greater bearing surface and thereby greater reliability in operation. To prevent four point bearing of balls in raceway, a clearance is given the balls on their diameter. The overhung load of the trolley pole tends to tip the swivel member by the amount of said clearance and lift it off one of the four sides of the groove, thus giving a three point bearing only and preventing excessive sliding and friction.

Although I have described my invention, setting forth a specific embodiment thereof, my invention is not limited to the details disclosed. Various changes in the construction thereof may be made within the scope of my invention. For instance, instead of providing several sets of ears on cover member 8 to mount the trolley structure, various other well known means for mounting trolleys of this nature may be substituted therefor. Instead of threaded projection 7 and nut 12 for holding parts 5 and 8 together, I may provide threads in opening 10 and screw projection 7 thereinto. The means for securing the base to the locomotive need not be exactly as shown and may comprise a larger or smaller number of bolts or the like.

I claim as my invention:

1. A trolley base comprising a support, a groove therein constituting an outer ball-race, an inner ball-race consisting of a plurality of co-operating members secured together, balls in said races, and means for securing a trolley pole to one of said members.

2. A trolley base comprising a support, a groove therein constituting an outer ball-race, an inner ball-race consisting of two co-operating members secured together, balls in said races, and means for securing a trolley pole to one of said members.

3. A trolley base comprising a support, a groove therein constituting an outer ball-race, an inner ball-race consisting of upper and lower co-operating members secured together, balls in said races, and means for securing a trolley pole to one of said members.

4. A trolley base comprising a support, a groove therein constituting an outer ball-race, an inner ball-race consisting of upper and lower co-operating members secured together, the upper member having an opening therein, the lower member being provided with a projection passing through said opening for holding said members together, balls in said races, and means for securing a trolley pole to one of said members.

5. A trolley base comprising a support, a groove therein constituting an outer ball-race, an inner ball-race consisting of upper and lower co-operating members secured together, the upper member having an opening therein, the lower member being provided with a projection passing through said opening, a nut thereon for holding said members together, balls in said races, and means for securing a trolley pole to one of said members.

6. A trolley base comprising a support, a groove therein constituting an outer ball-race, an inner ball-race consisting of a plurality of co-operating members secured together, balls in said races, and means for securing a trolley pole to the upper of said members.

7. A trolley base comprising a support, a groove therein constituting an outer ball-race, an inner ball-race consisting of a plurality of co-operating members secured together, balls in said races, means for securing said members together, and means for securing a trolley pole to one of said members.

8. A trolley base comprising a support, a groove therein constituting an outer ball-race, an inner ball-race consisting of a plurality of co-operating members secured together, balls in said races, means for securing said members together, said balls comprising means for holding the several parts in co-operative relation, and means for securing a trolley pole to one of said members.

9. A trolley base comprising a support, a single unbroken groove therein constituting a continuous ball-race, a swivel member, comprising two parts having beveled edges which constitute a continuous ball-race, balls in said race-ways, means for joining the parts of said swivel member and means for securing a trolley pole to said swivel member.

In testimony whereof, I have hereunto subscribed my name this 4th day of January 1923.

LELAND F. BURNHAM.